Patented May 29, 1945

2,376,956

UNITED STATES PATENT OFFICE 2,376,956

POLISHING COMPOSITION

Robert Brown, New York, N. Y.

No Drawing. Application December 16, 1941,
Serial No. 423,151

10 Claims. (Cl. 106—10)

The present invention relates to polishes and polishing pastes, and particularly for shoes and other leather goods.

It is the general object of the invention to provide an improved preparation of this type characterized by greater simplicity and economy of manufacture, by the property of acting as a softening and finishing agent for the treated surfaces, and by odorlessness and non-toxicity.

The present invention is of particular advantage for the manufacture of shoe polishes and will be described in greater detail in connection therewith.

Shoe polishes as at present manufactured contain considerable proportions of carnauba wax and also other waxes, such as montan wax, and in addition contain a number of other materials whose function is to keep the mixture stable, soften the leather, etc. The known formulae often include also a soap, various resins, and one or more coloring materials.

I have found that by the use of ground, preferably roasted, coffee beans, a considerable number of the materials heretofore included in shoe polish formulae can be eliminated, and particularly the soap, resin and wax components, either wholly, or in large part. Experiments conducted by me have established that the normal resin, gum and oily components of, preferably, roasted coffee beans provide excellent substitutes for corresponding components of known shoe polishes, and that, in general, the use of ground, roasted coffee beans presents a number of valuable advantages for shoe polishes and finishing agents for other types of surfaces.

I have discovered that a number of the components of coffee beans lend themselves with advantage for the manufacture of polishes and other finishes for leather, linoleums and other floorings, and in general all surfaces adapted to receive a wax or wax-like surfacing. The coffee beans present special advantages in the manufacture of shoe polishes, for they contain substances such as tannin, sugars and other carbohydrates, albumens, etc., which have a very marked softening and preserving action on the leather and improve or maintain its pliability.

Another advantage secured by the use of roasted coffee beans is that by controlling the degree of roasting, the color of the shoe polish mixture can be readily pre-determined. Thus for brown polishes the beans can be given a light roast; while for black polishes they can be given what is called a very high, or a "French" roast, that is, they are roasted quite black. In the latter case, part of the fibrous matter, and doubtless also part of the sugars, of the beans have been converted to a condition resembling carbon black. In this way, the amount of coloring matter which need be added to a brown or black polish can be reduced or the need for such added coloring matter even obviated.

A further advantage of the present invention is that the mixture can be kept in stable condition, i. e., the emulsion can be prevented from breaking, without the aid of organic solvents. These solvents, aside from their cost, are usually ill-smelling, and are objectionable also because of their toxic action on the skin.

The ground coffee beans are preferably employed in the form of a paste with cocoa butter or cocoanut or other saponifiable oils, the partially ground, roasted beans being preferably mixed with the cocoa butter or oil and reduced to a colloidal condition in a suitable colloid or other mill. Such a paste may be prepared, for example, by mixing and grinding three parts of ground, roasted beans and one part of cocoa butter.

In accordance with the present invention, the coffee bean-cocoa butter paste is mixed with a relatively large proportion of water and a small proportion of an alkali, a relatively cheap wax such as montan wax or spermacetti being added, if desired. A satisfactory formula is the following:

|  | Parts by weight |
|---|---|
| Water | 70 |
| Crude montan wax or spermacetti | 7 |
| Paraffin | 3.2 |
| Potassium hydroxide | 4–5 |
| Coffee bean-cocoa butter mixture | 14.5 |

The coffee beans, roasted to the desired shade, are ground and preliminarily mixed with one-third their weight of cocoa butter or saponifiable oil. The mixture is then reduced in a mill until a very fine, uniform paste is obtained. In preparing the shoe polish, the water is brought to the boiling point and there is added the potassium hydroxide. When the water has cooled to about 85° C. the montan wax and paraffin are added, after which the coffee paste is mixed in, the temperature being kept at about 83–85° C., the mass being thoroughly stirred. Where spermacetti is used, it should first be dissolved in ammonia water or alkali bicarbonate solution. The potassium hydroxide saponifies at least part of the oils of the coffee beans, at the same time liberating glycerine which acts as a softening agent. When the mixture has cooled to about 45–50° C. it is poured into tins and allowed to set.

In the above formula, a resin has been omitted, and likewise carnauba wax, but if desired, small proportions of both can be included. A dyestuff such as nigrosine or other suitable coloring matter can be added.

Whereas in certain known shoe polishes only limited amounts of water can be employed, as otherwise the mixture becomes unstable, with the formula of the present invention large proportions of water can be employed, even in the total absence of organic solvents. In other words, the paste-like character of the product can be produced entirely by means of water and without the aid of organic solvents, like turpentine, alcohols, etc., which tend to dry out the leather, and which, aside from being more costly, have the disadvantages above referred to. The capacity of my composition for absorbing and retaining, in stable condition, a large proportion of water, is due in large part of the fact that, as I have found, roasted coffee beans are able to absorb a very large proportion of water; in fact, ground coffee beans, as I have found, represent one of the best water-absorbing agents known. For this reason, the composition can contain, as the liquid agent, only water, without danger of rendering the resulting emulsion unstable.

It will be evident from what has been said above that no coloring agents are necessary for preparing black or even certain brown shades of shoe polishes according to the present invention, or at least not as much as heretofore employed. It will also be noted that the formula of the present invention dispenses with the use of the relatively expensive carnauba wax, while at the same time, the use of soap is rendered unnecessary. Also, the use of resins has been eliminated, and likewise, as already pointed out, the use of organic solvents.

The present invention possesses important advantages also in the preparation of polishes which are free from water, as it enables certain heretofore employed ingredients to be omitted. A representative waterless formula for a shoe polish is the following:

| | Parts by weight |
|---|---|
| Crude montan wax | 15 |
| Paraffin | 30 |
| Coffee-cocoanut oil paste (coffee roasted black) | 30 |
| Turpentine | 185 |

To the above, there may be added, if desired, one part of nigrosine.

The above formula eliminates the relatively expensive carnauba wax and also the ozokerite that is frequently used, while the quantity of nigrosine or other coloring matter is greatly reduced or even entirely eliminated.

It will be evident that my coffee containing composition can be employed also for polishing brown shoes, in which case a lighter roast is employed, and, if desired, a suitable brown coloring matter added to the mixture. The coffee paste can also be incorporated in various other types of waxes and polishing compositions as will be understood by those skilled in the art.

I prefer to employ the coffee beans in a roasted condition because, aside from the fact that the dehydrated fibrous matter of the beans provides black coloring matter which is useful for the preparation of black polishes, the roasting also liberates the various oils, resins and tannins of the beans, and thereby converts them into a condition in which they can be more active upon the surfaces to be treated. Of course, where light colored polishes are to be produced, a lightly roasted bean is to be employed. The advantages of my invention, even though in a lesser degree, can however be secured by the use of unroasted beans, although for most purposes, the roasted beans give better results.

The proportions given hereinabove are not critical and may be varied within considerable limits without departing from the spirit of my invention. Similarly, the method of preparation can be altered in ways which will readily suggest themselves to those familiar with this art.

I claim:

1. A polishing composition containing a wax and the reaction product of an alkali and a paste composed of ground, roasted coffee beans and a fatty material, the weight of alkali being less than that of the coffee beans.

2. A polishing composition containing a wax and the reaction product of an alkali and a paste compound of ground, roasted coffee beans and cocoa butter, the weight of alkali being less than that of the coffee beans.

3. A polishing composition containing a wax and the reaction product of an alkali and a paste composed of ground, roasted coffee beans and cocoanut oil, the weight of alkali being less than that of the coffee beans.

4. A polishing composition comprising a stable paste composed of water, a natural wax, an alkali, a fatty material and ground, roasted coffee beans, the weight of alkali being less than that of the coffee beans.

5. A shoe polish comprising water, a waxy material, an alkali, and a ground mixture of roasted coffee beans and a fatty material, the weight of alkali being less than that of the coffee beans.

6. A shoe polish comprising a mixture of water, montan wax, paraffin, potassium hydroxide and a paste composed of ground, roasted coffee beans and a fatty material, the weight of potassium hydroxide being less than that of the coffee beans.

7. A shoe polish comprising about 70 parts of water, about 10 parts of waxy material, about 14 parts of a mixture of 3 parts of ground, roasted coffee beans and 1 part of a fatty material, and a sufficient amount of an alkali to saponify at least part of the oils contained in the coffee beans.

8. An aqueous polishing paste containing ground coffee beans, a saponified fatty material and a waxy material in stable suspension in the aqueous medium.

9. A polishing paste containing a wax, a fatty material, and ground, roasted coffee beans stably suspended in a volatile liquid dispersing medium of the group consisting of water and hydrocarbon solvents.

10. A polishing paste composed of a wax, ground, roasted coffee beans suspended in a fatty material, and a volatile liquid dispensing medium of the group consisting of water and hydrocarbon solvents.

ROBERT BROWN.